US012137005B2

(12) United States Patent
Mayes

(10) Patent No.: US 12,137,005 B2
(45) Date of Patent: Nov. 5, 2024

(54) REAL TIME VIRTUAL TELEPORTATION IN A BROWSER

(71) Applicant: GOOGLE LLC, Mountain View, CA (US)

(72) Inventor: Jason Mayes, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/042,084

(22) PCT Filed: Aug. 24, 2020

(86) PCT No.: PCT/US2020/070453
§ 371 (c)(1),
(2) Date: Feb. 17, 2023

(87) PCT Pub. No.: WO2022/046149
PCT Pub. Date: Mar. 3, 2022

(65) Prior Publication Data
US 2023/0246864 A1   Aug. 3, 2023

(51) Int. Cl.
*H04L 12/18* (2006.01)
*G06V 20/40* (2022.01)
(52) U.S. Cl.
CPC .......... *H04L 12/1822* (2013.01); *G06V 20/49* (2022.01)
(58) Field of Classification Search
CPC ............................. H04L 12/1822; G06V 20/49
See application file for complete search history.

(56) References Cited

U.S. PATENT DOCUMENTS

| 9,881,207 | B1* | 1/2018 | Nguyen | G06N 3/044 |
| 2013/0063549 | A1* | 3/2013 | Schnyder | H04N 13/264 |
| | | | | 348/E13.068 |
| 2018/0017937 | A1* | 1/2018 | Guarini | H04N 21/266 |
| 2019/0222806 | A1 | 7/2019 | Soppelsa et al. | |
| 2020/0294317 | A1 | 9/2020 | Segal | |
| 2021/0056765 | A1 | 2/2021 | Nishibe et al. | |

FOREIGN PATENT DOCUMENTS

| JP | 2001014474 A | 1/2001 |
| JP | 2006333301 A | 12/2006 |
| JP | 2014086774 A | 5/2014 |

(Continued)

OTHER PUBLICATIONS

International Search Report and Written Opinion for PCT Application No. PCT/US2020/070453, mailed on May 3, 2021, 14 pages.

(Continued)

*Primary Examiner* — Philip C Lee
(74) *Attorney, Agent, or Firm* — Brake Hughes Bellermann LLP

(57) ABSTRACT

A method including opening a web-based video call in a browser on a first device (145), receiving a request to join the web-based video call from a second device (150), capturing (110), by the first device, a video including a frame (105), segmenting (115), by the first device, the frame, selecting, by the first device, at least one segment (120) of the segmented frame, and streaming (125), directly from the first device to the second device, the video including the at least one segment as a real-time virtual teleportation (140).

23 Claims, 6 Drawing Sheets

(56) References Cited

FOREIGN PATENT DOCUMENTS

| | | |
|---|---|---|
| JP | 2015177296 A | 10/2015 |
| WO | 2016203792 A1 | 12/2016 |
| WO | WO-2021034338 A1 * | 2/2021 ............. G06V 20/41 |

OTHER PUBLICATIONS

Jikadra et al.: "Video Calling With Augmented Reality Using WEBRTC API", IEEE; 6th International Conference on Computing for Sustainable Global Development (INDIACom), Mar. 13, 2019, pp. 363-367.

Lehment et al.: "Creating Automatically Aligned Consensus Realities for AR Videoconferencing", IEEE International Symposium on Mixed and Augmented Reality 2014 Science and Technology Proceedings, Munich, Germany, Sep. 10-12, 2014, pp. 201-206.

Suciu et al.: "WEBRTC Role in Real-Time Communication and Video Conferencing", 2020 Global Internet of Things Summit (GIOTS), IEEE, Jun. 3, 2020, 6 pages.

Office Action for Japanese Application No. 2023-513192 (with English translation), mailed Jul. 9, 2024, 10 pages.

\* cited by examiner

REAL TIME VIRTUAL TELEPORTATION IN A BROWSER

CROSS REFERENCE TO RELATED APPLICATION

This application is a 35 U.S.C. § 371 National Phase Entry Application from PCT Application No. PCT/US2020/070453, filed on Aug. 24, 2020, entitled "REAL TIME VIRTUAL TELEPORTATION IN A BROWSER", and designating the U.S., the disclosure of which is incorporated herein in its entirety by reference.

FIELD

Embodiments relate to streaming video in a video conference web-based environment.

BACKGROUND

Video calls can make users feel separated from each other. In other words, the social interaction can feel distant because the two or more participants are in different locations with each participant viewing the others location, or an artificial background, on a viewing device (e.g., a mobile phone). Further, in order to conduct a video conference with advanced features (e.g., background modification) a full feature application is required to be installed on the user device(s).

SUMMARY

In a general aspect, a device, a system, a non-transitory computer-readable medium (having stored thereon computer executable program code which can be executed on a computer system), and/or a method can perform a process with a method including opening a web-based video call in a browser on a first device, receiving a request to join the web-based video call from a second device, capturing, by the first device, a video including a frame, segmenting, by the first device, the frame, selecting, by the first device, at least one segment of the segmented frame, and streaming, directly from the first device to the second device, the video including the at least one segment as a real-time virtual teleportation.

Implementations can include one or more of the following features. For example, the opening of the web-based video call includes loading a webpage, the webpage including code configured to implement a trained machine learned model, the trained machine learned model can be configured to segment the frame and select the at least one segment. The at least one segment can be an image of a participant in the web-based video call. The web-based video call can be implemented using a web-based communications standard. The segmenting of the frame can include grouping pixels in the frame into semantic areas to locate objects and boundaries, classifying pixels of the frame into two categories: 1) pixels that represent a person and 2) pixels that represent background, and segmenting the pixels that represent the person from the frame. The segmenting of the frame can include identifying each object in the frame, the selecting of at least one segment includes selecting an object as the at least one segment, and the object can be a participant in the web-based video call. The at least one segment can be an image of a participant in the web-based video call, and the method can further include converting the image from a two-dimensional image to a three-dimensional image. The at least one segment can be an image of a participant in the web-based video call, and the method can further include applying a filter to the image. The web-based video call can be implemented as a zero-installation web application.

In another general aspect, a device, a system, a non-transitory computer-readable medium (having stored thereon computer executable program code which can be executed on a computer system), and/or a method can perform a process with a method including opening a web-based video call webpage in a browser on a first device, communicating, by the first device, a request to join a web-based video call from a second device receiving, at the first device directly from the second device, a streamed video as a first video, capturing, by the first device, a second video, orienting, by the first device, the first video based on the second video, projecting, by the first device, the first video into the second video to generate a third video, and rendering, by the first device, a webpage including the third video.

Implementations can include one or more of the following features. For example, the method can further include generating a plane, and the orienting of the first video can include determining a normal vector associated with the second video, and at least one of rotating and translating the first video based on the normal vector. The method can further include generating a plane and positioning the plane in the second video, wherein the projecting of the first video into the second video includes adding the first video to the plane. The method can further include generating a plane and positioning the plane in the second video, and the orienting of the first video can include determining a normal vector associated with the second video, and at least one of rotating and translating the first video based on the normal vector, and the projecting of the first video into the second video can include adding the first video to the plane. The first video can be of a first participant in the web-based video call, and the second video can be a real-world video. The plane can be a transparent two-dimensional virtual structure positioned in the second video. The plane can have a size that is proportional to a display of a device rendering the web-based video call webpage. The web-based video call webpage can include code configured to implement a trained machine learned model, and the web-based video call webpage can include code configured to implement a web-based augmented reality tool. The web-based video call webpage and the web-based video call can be implemented as a zero-installation web application.

In yet another general aspect, a device, a system, a non-transitory computer-readable medium (having stored thereon computer executable program code which can be executed on a computer system), and/or a method can perform a process with a method including opening a web-based video call in a browser on a first device, receiving a request to join the web-based video call from a second device, capturing, by a first device, a first video including a frame, segmenting, by the first device, the frame, selecting, by the first device, at least one segment of the segmented frame, streaming, directly from the first device to the second device, the first video including the at least one segment as a first real-time virtual teleportation image, receiving, by the first device directly from the second device, a streamed video as a second video, the second video including a second real-time virtual teleportation image, capturing, by the first device, a third video, orienting, by the first device, the second video based on the third video, projecting, by the first device, the second video into the third video to generate a fourth video including the second real-time virtual teleportation image, and rendering, by the first device, a webpage including the fourth video.

Implementations can include one or more of the following features. For example, the opening web-based video call can include loading a webpage, the webpage can include code configured to implement a trained machine learned model, the trained machine learned model can be configured to segment the frame and select the at least one segment, and the webpage including code can be configured to implement a web-based augmented reality tool. The web-based video call can be implemented as a zero-installation web application. The segmenting of the frame can include identifying each object in the frame, the selecting of at least one segment can include selecting an object as the at least one segment, and the object can be a participant in the web-based video call. The method can further include generating a plane and positioning the plane in the second video, and the orienting of the first video can includes determining a normal vector associated with the second video, and at least one of rotating and translating the first video based on the normal vector, and the projecting of the first video into the second video can include adding the first video to the plane.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
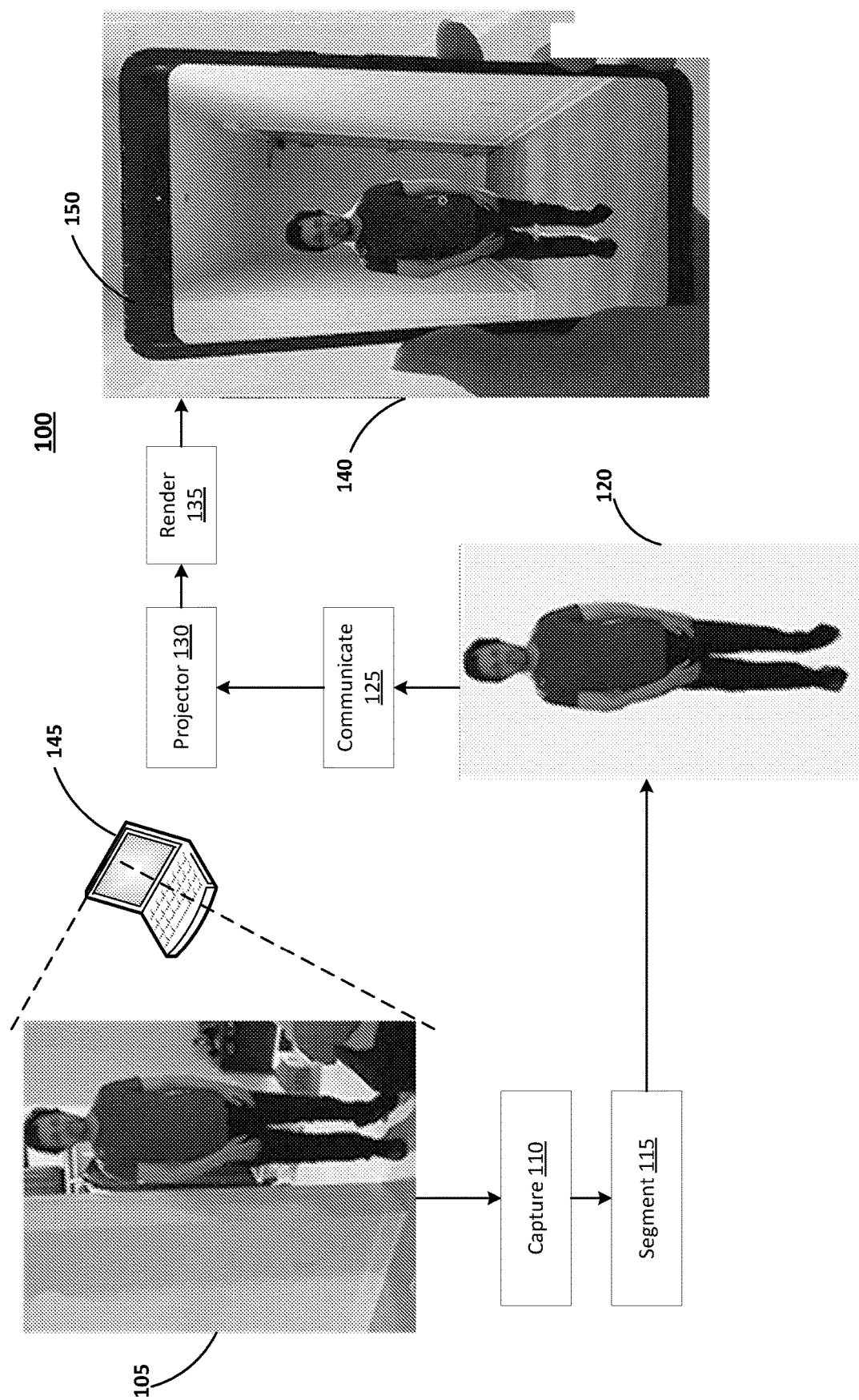
FIG. 1 illustrates a block diagram of a signal flow according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

A user experience in a video call can be less than desirable because the participants are presented in their own environment and confined to display (e.g., a rectangular display). Participants being in disparate environments can cause the participants to feel socially distant and/or can result in an undesirable social interaction between the users.

To solve the problem described above, images of a first participant in a video call can be extracted from a first environment and projected into (or reprojected into) a second environment of a second participant. In other words, example embodiments can generate and communicate an image of one or more participants into another environment (e.g., another participant's environment) as viewed on a device (e.g., a mobile device). Implementations can enable a virtual teleportation video call including generating and communicating an image of a first video call participant and projecting the image of the first video call participant into the viewing field on the device of a second video call participant and allowing the second video call participant to walk up to the first video call participant and/or around the first video call participant as if the first video call participant is in the space of the second video call participant.

Example implementations can include segmenting the streaming video of at least one participant and projecting the segmented portion of the streaming video including the participant into the display of a device. Further, the generation and communication of an image of the participant can be implemented in a webpage in real-time (e.g., live, with minimal delay, and/or the like). Implementation in a webpage may not involve installation of an application onto a local device. In other words, implementations can be in a zero-installation computing environment (e.g., no user downloading file or memory insert of a file to install an application). A zero-installation computing environment can have an advantage of being flexible in that a change to a web-based video call application can affect all users of the web-based video call application and the user may take no actions other than opening a webpage for use.

In addition, a video call application can be web-based and/or use an application installed on a device. In either case, a server configured to control streaming communications is used. In example implementations, the video call can stream video directly from the first device to the second device. Therefore, example implementations disclose new video call features including, at least, providing tools for a virtual teleportation video call in a browser without use of a server configured to control streaming communications (e.g., a third-party server). In example implementations, web-based refers to functionality that is implemented in a browser using, for example a web server to communicate (via the internet using HTTP(S)) image(s), video(s), text, and the like that can be displayed as a webpage in the browser on a display of a computing device. Further, the web server can communicate software code (e.g., JavaScript, c++, VisualBasic, and/or the like) that can be executed by the computing device in association with the webpage. A server configured to control streaming communications (e.g., a third-party server) is (or operates) independent of (e.g., is not the same as) the web server.

FIG. 1 illustrates a block diagram of a signal flow according to at least one example embodiment. As shown in FIG. 1, the signal flow 100 includes a capture 110 block, a segment 115 block, a communicate 125 block, a projector 130 block, and a render 135 block. In the capture 110 block, image 105 is captured using the camera of a computing device (e.g., a desktop, a laptop, a mobile device, a stand-alone image capture system, and/or the like). Through the embodiment illustrated herein, an image of one or more participants can be projected (or reprojected) from at least one environment into at least one other environment as viewed on a device. Accordingly, signal flow 100 can illustrate an example implementation of a virtual teleportation video call.

Image 105 can be a frame of a video corresponding to video of a video call on a first device 145 including a camera. Image 105 can include pixels corresponding to, at least, a participant in a video call and the environment in which the participant in the video call is located (sometimes called a background). Data representing image 105 is communicated to the segment 115 block. The segment 115 block can segment image 105 into at least two segments one of which can be pixels corresponding to the participant in the video call. The segmented image including the participant in the video call is illustrated as image 120.

Image 120 is communicated from the first device 145 capturing the image (e.g., a device including the capture 110 block and the segment 115 block) to a second device 150 via the communicate 125 block. Communicate 125 block can stream video corresponding to the video call of which image 120 represents a frame of the video. Image 120 can be a portion of a captured frame (e.g., image 105). Therefore, image 120 can include less data than a complete frame. As a result, example implementations can use less resources (e.g., bandwidth) than a video call that streams complete frames. Streaming can use a web-based communications standard (e.g., webRTC, VoIP, RTP, PTP Telephony, and/or the like).

The second device can receive image 120 and project (projector 130) the image into an image being captured (e.g., a real-world image) by the second device that has yet to be displayed on the second device. Projecting image 120 can include selecting a location and orientation of image 120 with respect to the image captured by the second device. The resultant image can be rendered (the render 135 block) and displayed on the second device as shown in image 140.

Figure 2B:
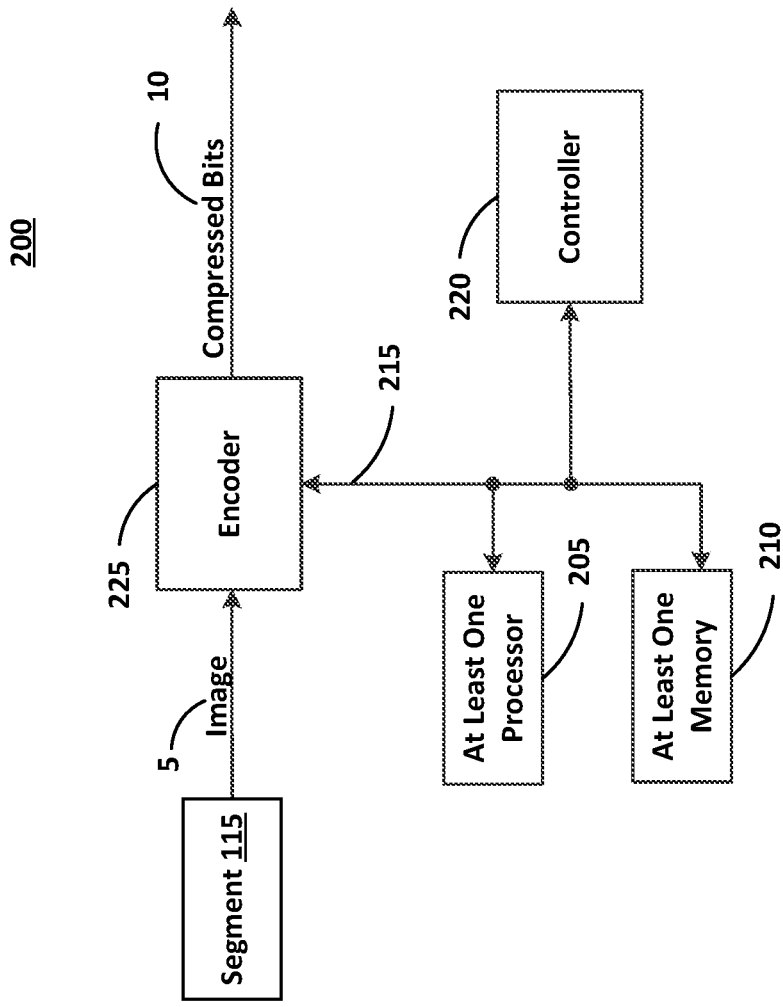
FIG. 2B illustrates an encoder system according to at least one example embodiment.
Figure 2A:
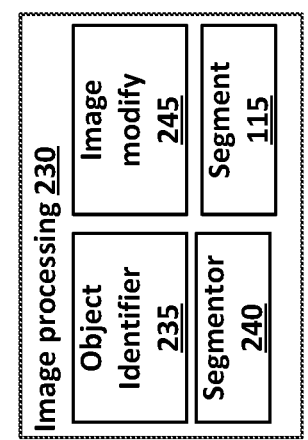
FIG. 2A illustrates a block diagram of an image processing module according to at least one example embodiment.

FIG. 2A illustrates a block diagram of an image processing module according to at least one example embodiment. As shown in FIG. 2A, the image processing 230 module includes an object identifier 235, a segmentor 240, an image modify 245 module, and the segment 115. As described above, the video call can be implemented in a web-page. Therefore, the image processing 230 module can be an element of the web-page. For example, the image processing 230 module can be implemented in JavaScript. The image processing 230 module can include machine learned elements for example, the image processing 230 module can include a machine learned model (e.g., a convolutional neural network (CNN). Therefore, the image processing 230 module can include a trained machine learned (ML) model implemented in JavaScript (e.g., TensorFlow.js). Further, the image processing 230 module can be loaded on a computing device with the loading of the web-page. Therefore, the trained ML model implemented in JavaScript can be loaded on the computing device with the loading of the web-page. Accordingly, the image processing 230 module can enable (or help enable) performing a virtual teleportation video call in a browser without installation of an application onto the device.

The object identifier 235 can be configured to identify each object in an image or frame of a video call. The object identifier 235 can be configured to identify one object as a participant in the video call. The object identifier 235 can use a trained ML model (e.g., a convolutional neural network (CNN) to identify the object. Therefore, the object identifier 235 can use a trained ML model implemented in JavaScript (e.g., TensorFlow.js) to identify the object.

An image or frame of a video (e.g., image 105) can include a plurality of objects. The trained ML model associated with the object identifier 235 can place a plurality of boxes (sometimes called bounding boxes) on the image. The object identifier can associate data (e.g., features associated with pixels of the image) with each of the boxes. The data can indicate an object in the box (the object can be no object or a portion of an object). An object can be identified by its features. The data, cumulatively, is sometimes called a class or classifier. The class or classifier can be associated with an object. The data (e.g., a bounding box) can also include a confidence score (e.g., a number between zero (0) and one (1)).

After the trained ML model processes the image or frame of the video, the trained ML model can process a plurality of classifiers indicating an object or a same object. In other words, an object (or a portion of an object) can be within a plurality of overlapping bounding boxes. However, the confidence score for each of the classifiers can be different. For example, a classifier that identifies a portion of an object can have a lower confidence score than a classifier that identifies a complete (or substantially complete) object. The trained ML model can be further configured to discard the bounding boxes without an associated classifier. In other words, the trained ML model can discard bounding boxes without an object in them. The trained ML model can identify the objects using classifiers with the highest confidence score. One of the objects can be identified as a participant in the video call (e.g., as a human or portion of a human).

The segmentor 240 can be configured to generate an image that includes the participant (and no other object or background pixels). For example, the object identifier 235 can pass coordinates of the box including the participant. The segmentor 240 can delete pixels in the image that are not within the box. The segmentor 240 can copy the contents of the box to a new image. Further, the segmentor 240 can be configured to modify the boundaries of the object to remove any undesired pixels, smooth transitions, to improve the image that is the participant (e.g., image 120). The segmented image is stored as segment 115.

In some implementations, the object identifier 235 and the segmentor 240 can be combined into one operation. For example, image segmentation for body parts can be part of a ML tool or model. This ML tool can be configured to group pixels in an image into semantic areas to locate objects and boundaries. For example, the ML tool or model can be configured to classify the pixels of an image into two categories: 1) pixels that represent a person and 2) pixels that represent background. Then the pixels that represent the person can be segmented from the image.

The image modify 245 module can be configured to modify the segmented image and/or to generate a new image (e.g., as segment 115) based on the segmented image. The image modify 245 module can be configured to generate a three-dimensional (3D) image from a two-dimensional image. A 2D-3D conversion tool can be an element of the web-page (e.g., as JavaScript). The conversion tool can be implemented with the segmented image as an input. For example, the conversion tool can use a depth map (e.g., associated with the participant), a 3D mesh, a warping algorithm, and/or the like. The conversion tool can be implemented as a trained ML model. In an example implementation, the 2D to 3D conversion can be a partial conversion (e.g., add depth to a portion of the segmented image).

The image modify 245 module can be configured to apply an image filter to the segmented image. For example, the image modify 245 module can apply a ghosting filter, a color filter, an enhancement filter, a holographic filter, an overlay filter, and/or the like. The image modify 245 module can be configured to enhance (e.g., improve quality, resolution, and/or the like) the segmented image. The image modify 245 module can be configured to complete the segmented image. For example, the segmented image can be a portion (e.g., the head) of the participant and the image modify 245 module can add to (e.g., add a body) the segmented image. The image modify 245 module can be configured to modify the segmented image using other techniques not described herein for the sake of brevity.

In the example of FIG. 2B, an encoder system 200 may be, or include, at least one computing device and should be understood to represent virtually any computing device configured to perform the techniques described herein. As such, the encoder system 200 may be understood to include various components which may be utilized to implement the techniques described herein, or different or future versions thereof. By way of example, the encoder system 200 is illustrated as including at least one processor 205, as well as at least one memory 210 (e.g., a non-transitory computer readable storage medium).

FIG. 2B illustrates the encoder system according to at least one example embodiment. As shown in FIG. 2B, the encoder system 200 includes the at least one processor 205, the at least one memory 210, a controller 220, and an encoder 225. The at least one processor 205, the at least one memory 210, the controller 220, and the encoder 225 are communicatively coupled via bus 215. The encoder system can be an element of a video call implemented via a web-page. In an example implementation, the encoder 225 and the controller 220 is loaded on a computer as the web-page configured to implement the video call is loaded. The encoder 225 and the controller 220 can use (or be elements of) a web-based communications standard (e.g., webRTC, VoIP, RTP, PTP Telephony, and/or the like). The encoder system 200 can use the segment 115 as an input.

The at least one processor 205 may be utilized to execute instructions stored on the at least one memory 210. Therefore, the at least one processor 205 can implement the various features and functions described herein, or additional or alternative features and functions. For example, the processor 205 can execute code associated with the web-page configured to implement the video call that is stored in the at least one memory 210. The at least one processor 205 and the at least one memory 210 may be utilized for various other purposes. For example, the at least one memory 210 may represent an example of various types of memory and related hardware and software which may be used to implement any one of the modules described herein.

The at least one memory 210 may be configured to store data and/or information associated with the encoder system 200 (e.g., to implement a web-based communications standard (e.g., webRTC, VoIP, RTP, PTP Telephony, and/or the like)). The at least one memory 210 may be a shared resource. For example, the encoder system 200 may be an element of a larger system (e.g., a server, a personal computer, a mobile device, and/or the like). Therefore, the at least one memory 210 may be configured to store data and/or information associated with other elements (e.g., image/video serving, web browsing or wired/wireless communication) within the larger system.

The controller 220 may be configured to generate various control signals and communicate the control signals to various blocks in the encoder system 200 and/or the image processing 230 module. The controller 220 may be configured to generate the control signals to implement the techniques described herein. The controller 220 may be configured to control the encoder 225 to encode an image, a sequence of images, a video frame, a sequence of video frames, and/or the like according to example implementations. For example, the controller 220 may generate control signals corresponding to encoding and communicating images (or frames) associated with a web-based communications standard (e.g., webRTC, VoIP, RTP, PTP Telephony, and/or the like).

The encoder 225 may be configured to receive an input image 5 (and/or a video stream) and output compressed (e.g., encoded) bits 10. The encoder 225 may convert a video input into discrete video frames (e.g., as images). The input image 5 may be compressed (e.g., encoded) as compressed image bits. The encoder 225 may further convert each image (or discrete video frame) into a matrix of blocks or macro-blocks (hereinafter referred to as blocks). For example, an image may be converted to a 32×32, a 32×16, a 16×16, a 16×8, an 8×8, a 4×8, a 4×4 or a 2×2 matrix of blocks each having a number of pixels. Although eight (8) example matrices are listed, example implementations are not limited thereto.

The compressed bits 10 may represent the output of the encoder system 200. For example, the compressed bits 10 may represent an encoded image (or video frame). For example, the compressed bits 10 may be stored in a memory (e.g., at least one memory 210). For example, the compressed bits 10 may be ready for transmission to a receiving device (not shown). For example, the compressed bits 10 may be transmitted to a system transceiver (not shown) for transmission to the receiving device.

The at least one processor 205 may be configured to execute computer instructions associated with the image processing 230 module, the controller 220 and/or the encoder 225. The at least one processor 205 may be a shared resource. For example, the encoder system 200 may be an element of a larger system (e.g., a mobile device, a desktop, a laptop, and/or the like). Therefore, the at least one processor 205 may be configured to execute computer instructions associated with other elements (e.g., image/video capture, web browsing, and/or wired/wireless communication) within the larger system.

In an example implementation, the image processing 230 module can be an element of the encoder 225. For example, the image 5 can be a plurality of frames of a streaming video. The encoder 225 can be configured to process each frame individually. Therefore, the encoder can select a frame of the streaming video and communicate the selected frame to the image processing 230 module as input to the image processing module. After processing the frame, the image processing 230 module can generate segment 115 which can then be processed (e.g., compressed) by the encoder 225.

Figure 3B:
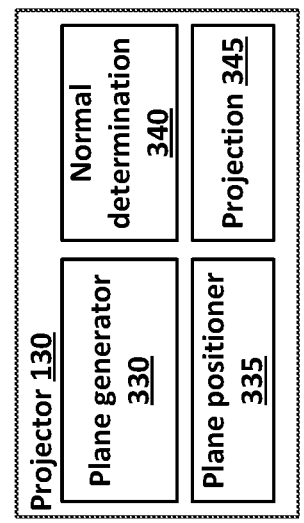
FIG. 3B illustrates a block diagram of a projector module according to at least one example embodiment.
Figure 3A:
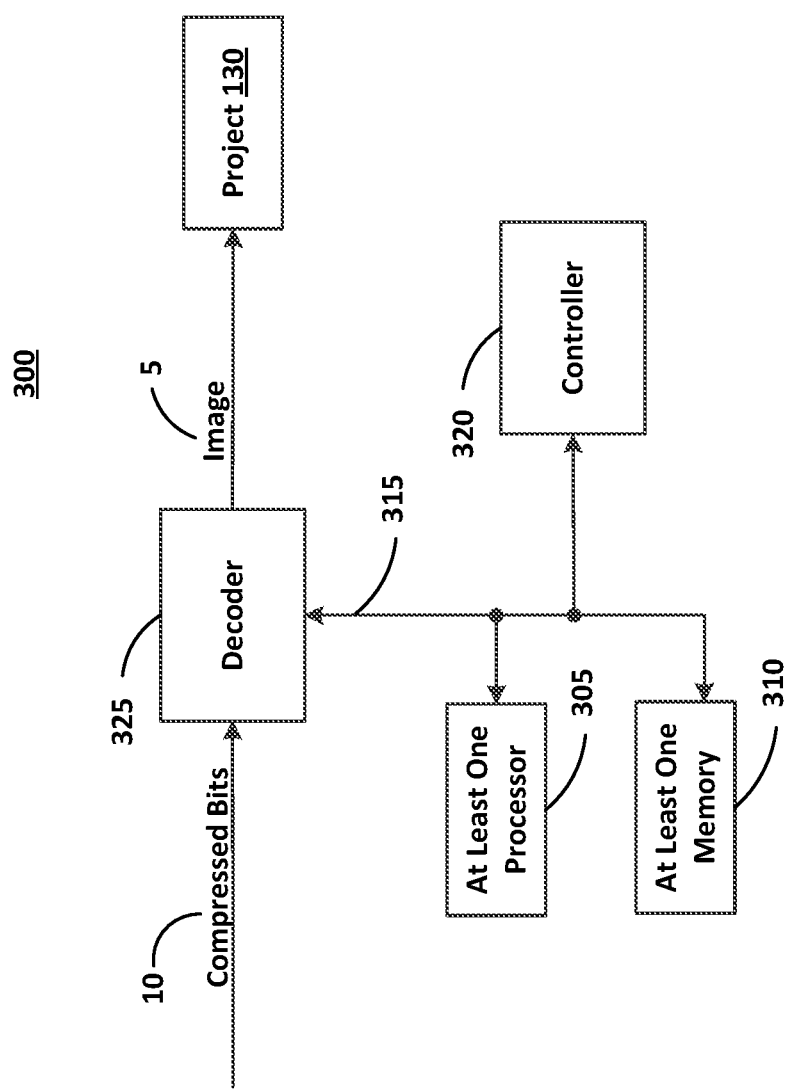
FIG. 3A illustrates a decoder system according to at least one example embodiment.

FIG. 3A illustrates the decoder system according to at least one example embodiment. As shown in FIG. 3A, the decoder system 300 includes the at least one processor 305, the at least one memory 310, a controller 320, and a decoder 325. The at least one processor 305, the at least one memory 310, the controller 320, and the decoder 325 are communicatively coupled via bus 315.

In the example of FIG. 3A, a decoder system 300 may be at least one computing device and should be understood to represent virtually any computing device configured to perform the techniques described herein. As such, the decoder system 300 may be understood to include various components which may be utilized to implement the techniques described herein, or different or future versions thereof. For example, the decoder system 300 is illustrated as including at least one processor 305, as well as at least one memory 310 (e.g., a computer readable storage medium).

Therefore, the at least one processor 305 may be utilized to execute instructions stored on the at least one memory 310. As such, the at least one processor 305 can implement the various features and functions described herein, or additional or alternative features and functions (e.g., to implement a web-based communications standard (e.g., webRTC, VoIP, RTP, PTP Telephony, and/or the like)). The at least one processor 305 and the at least one memory 310 may be utilized for various other purposes. For example, the at least one memory 310 may be understood to represent an example of various types of memory and related hardware and software which can be used to implement any one of the modules described herein. According to example implementations, the decoder system 300 may be included in larger system (e.g., a personal computer, a laptop computer, a mobile device and/or the like).

The at least one memory 310 may be configured to store data and/or information associated with the projector 130 and/or the decoder system 300. The at least one memory 310 may be a shared resource. For example, the decoder system 300 may be an element of a larger system (e.g., a personal computer, a mobile device, and the like). Therefore, the at least one memory 310 may be configured to store data and/or information associated with other elements (e.g., web browsing or wireless communication) within the larger system (e.g., to implement a web-based communications standard (e.g., webRTC, VoIP, RTP, PTP Telephony, and/or the like)).

The controller 320 may be configured to generate various control signals and communicate the control signals to various blocks in the projector and/or the decoder system 300. The controller 320 may be configured to generate the control signals in order to implement the video encoding/decoding techniques described herein. The controller 320 may be configured to control the decoder 325 to decode a video frame according to example implementations.

The decoder 325 may be configured to receive compressed (e.g., encoded) bits 10 as input and output an image 5. The compressed (e.g., encoded) bits 10 may also represent compressed video bits (e.g., a video frame). Therefore, the decoder 325 may convert discrete video frames of the compressed bits 10 into a video stream.

The at least one processor 305 may be configured to execute computer instructions associated with the projector 130, the controller 320 and/or the decoder 325. The at least one processor 305 may be a shared resource. For example, the decoder system 300 may be an element of a larger system (e.g., a personal computer, a mobile device, and the like). Therefore, the at least one processor 305 may be configured to execute computer instructions associated with other elements (e.g., web browsing or wireless communication) within the larger system.

FIG. 3B illustrates a block diagram of the projector 130 according to at least one example embodiment. As shown in FIG. 3B, the projector 130 includes a plane generator 330 module, a plane positioner 335 module, a normal determination 340 module, and a projection 345 module. In an example implementation, a web-based video call includes at least two computing devices. A first computing device can be utilized by a first participant and the second computing device can be used by a second participant. In a web-based virtual teleportation video call, the first device can include the elements described with regard to FIGS. 2A and 2B to generate an image of the first participant and the second device can include the elements described with regard to FIGS. 3A and 3B to receive the image of first participant and to project the first participant into the second participants environment. Accordingly, the projector 130 can advantageously enable (or help enable) performing a virtual teleportation video call in a browser without installation of an application onto the device. Further, example implementations can include communicating images of the first participant, the second participant and/or both the first and second participant.

As such, the plane generator 330 module can be configured to generate a plane to project the image of the first participant on the second device. The plane positioner 335 module can be configured to select a location on the display of the second device to place the plane in the physical world environment of the second device. In an example implementation, the user of the second device can on the display of the second device to reference a real-world location to render to. This is sometimes called mixed reality. The normal determination 340 module can be configured to orient the plane on the display of the second device. The projection 345 module can be configured to project the first participant (e.g., as segment 115) in the plane.

The plane generator 330 module can generate a plane by generating a 2D virtual structure (e.g., a rectangle). The 2D structure can have a size based on proximity to the plane in the real-world where the plane is placed. In some cases, if the user is close the rectangle could be bigger than the device itself and only a subsection of the first participant may be displayed. The 2D structure can have a size based on the display of the second device. For example, the 2D structure can have a size that is proportional to the display and smaller than the display. The 2D structure can be transparent (e.g., to allow a background to be visible). The 2D structure can be implemented via a function call (e.g., via a web-based display tool and/or a web browser). An example code snippet is shown below:

```
marker.setAttribute('position', {
x: cursor.intersection.point.x,
y: cursor.intersection.point.y + 0.5,
z: cursor.intersection.point.z});
var rot = cam.getAttribute('rotation')
marker.setAttribute('rotation', {
x: 0,
y: rot.y,
z: 0
});
```

The plane positioner 335 module can be configured to select a location on the display of the second device to place the plane. The location can be based on an image (e.g., preview image) captured by the second device and being displayed on the device using a web-based application (e.g., a browser). For example, referring to FIG. 1, image 140 is of a hallway. The location of the plane can be placed approximately centered in the hallway and at a depth that is comfortable to view. Accordingly, the location can be based on pixel positions (e.g., X, Y position) and a depth. The depth can be determined using a depth sensor or the camera on the device and/or be calculated using a depth algorithm (e.g., using web-based tools, web-based augmented reality tools, and/or JavaScript tools (e.g., WebXR)). In other words, the depth can be determined using a function call in a web-based (e.g., JavaScript) augmented reality tool (e.g., WebXR) that can return a depth map. In an example implementation, the location can be determined using a web-based tool configured to render virtual objects (e.g., the plane or the communicated image of the participant) in the real-world (e.g., as an image captured using the camera of the device and being displayed via a web browser). An example code snippet is shown below:

```
var sc = document.querySelector('a-scene');
var cam = document.getElementsByTagName('a-camera')[0];
var cursor = sc.querySelector('[ar-raycaster]').components.cursor;
if (cursor.intersection) {
}
```

The normal determination 340 module can be configured to orient the plane on the display of the second device. For example, a normal associated with the real-world (e.g., as an image captured using the camera of the device and being displayed via a web browser) and the plane position can be determined. The plane can then be oriented (e.g., translated, rotated, and/or the like) relative to the real-world such that the plane approximates a perpendicular orientation with the normal. In an example implementation, the normal orientation associated with each pixel in the real-world can be determined (e.g., estimated). Once there is a normal vector associated with each pixel, normal can be associated with pixels in world coordinates. The normal vectors and the pixels can be generated using a web-based augmented reality tools, and/or JavaScript tools (e.g., WebXR)). For example, the normal vectors can be projected from the plane into pixels in the real-world. Orientation can be implemented and/or confirmed by projecting a normal vector from the oriented plane into the real-world. The normal vectors should be approximately equivalent and in opposite directions. An example code snippet is shown below:

```
var rot = cam.getAttribute('rotation')
marker.setAttribute('rotation', {
x: 0,
y: rot.y,
z: 0
});
```

The projection 345 module can be configured to project the first participant (e.g., as segment 115) into the plane. For example, pixels representing an image of the first participant (e.g., decompressed segment 115) can be added to the plane. Projection can include adding look and feel features to improve the user experience. For example, a shadow can be added to the resultant image. The projection 345 module can be implemented as a function of rendering the modified (e.g., with the communicated image of the first participant) real-world image on the display of the second device. Rendering can be a function of the displaying the web-page in a browser implementing the video call and/or the web-based communications standard (e.g., webRTC, VoIP, RTP, PTP Telephony, and/or the like). An example code snippet is shown below:

```
marker.setAttribute('src', data.src);
```

Figure 4:
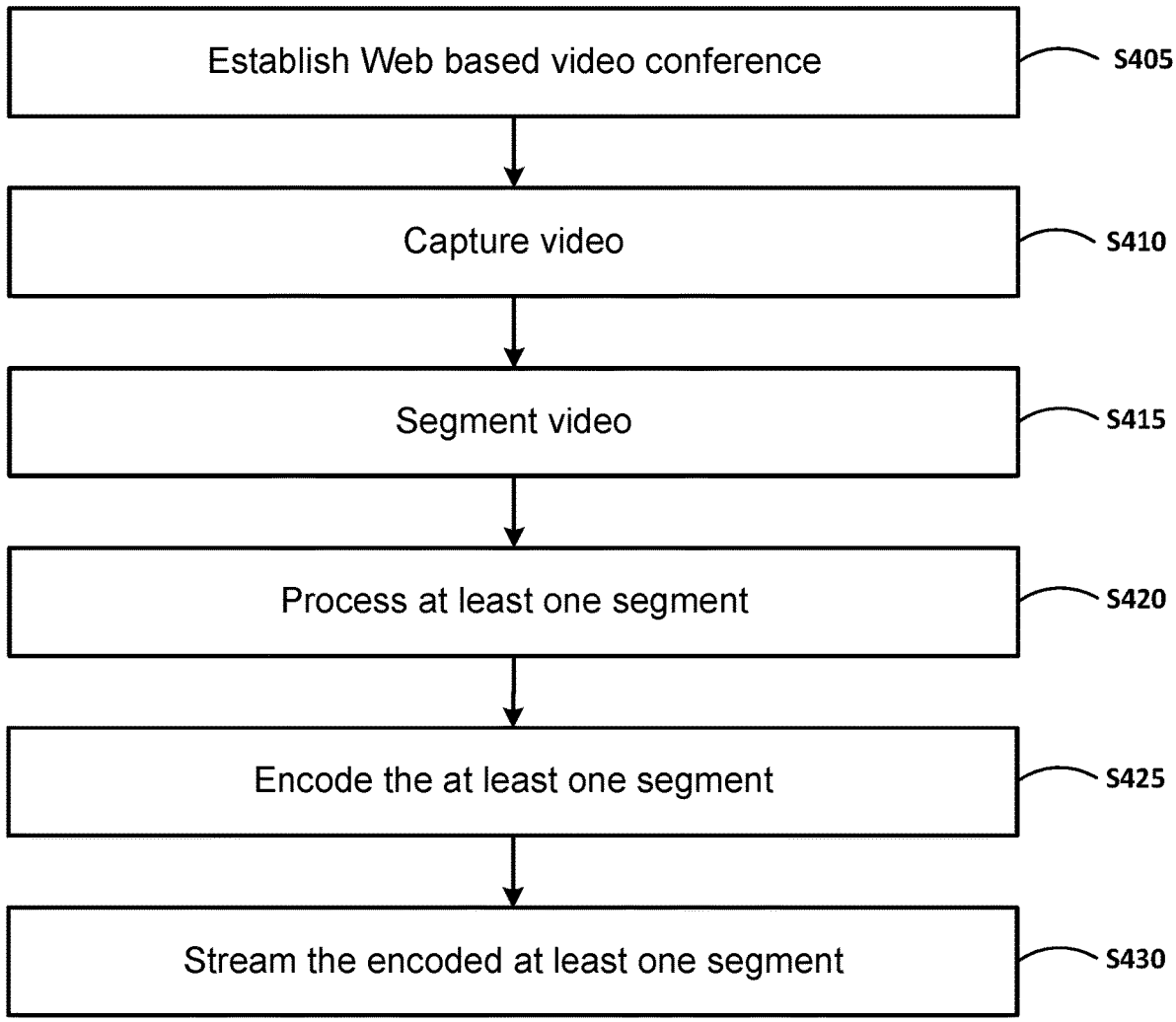
FIG. 4 illustrates a block diagram of a method for conducting a portion of a web-based video call according to at least one example embodiment.
Figure 5:
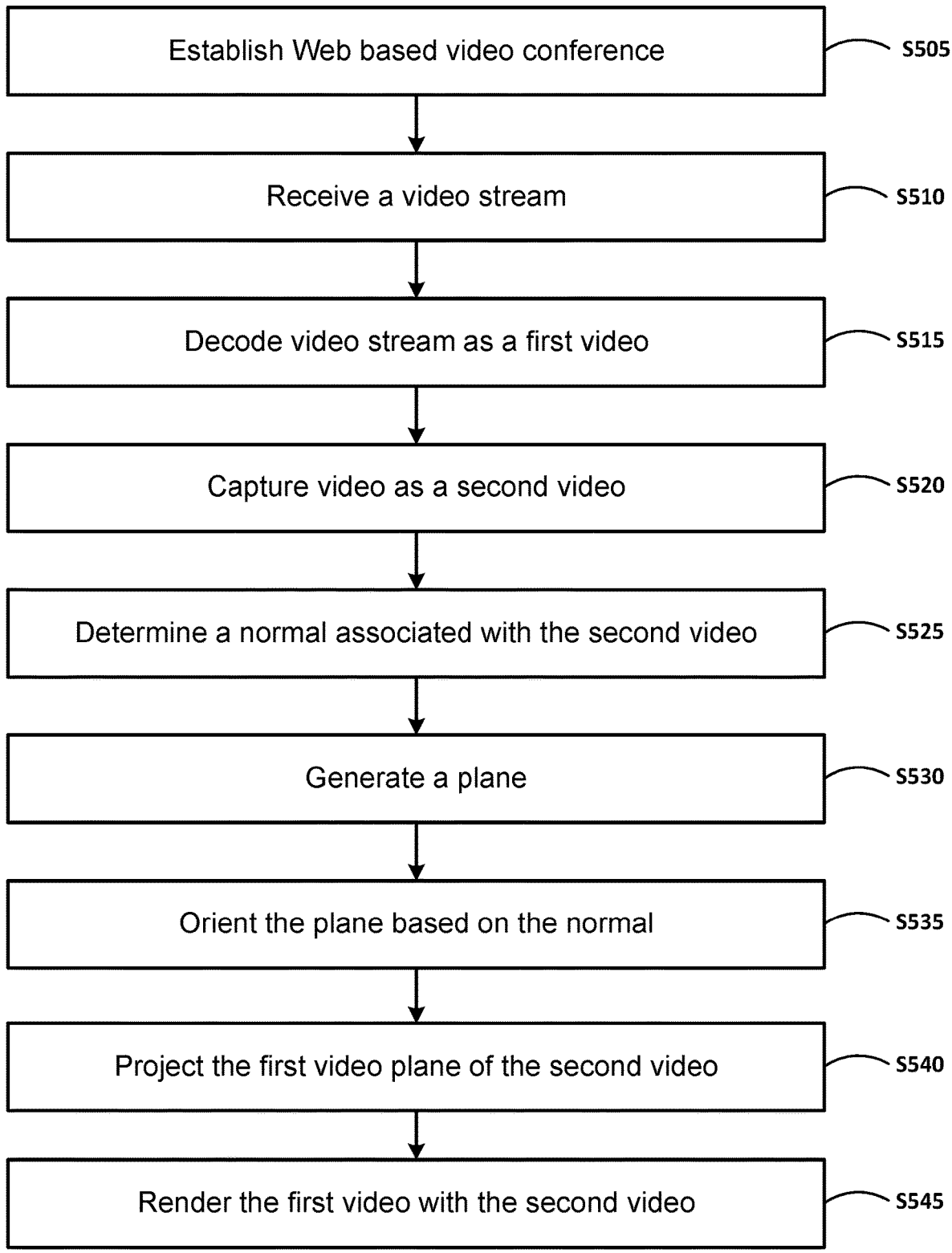
FIG. 5 illustrates a block diagram of a method for conducting another portion of a web-based video call according to at least one example embodiment.

FIGS. 4 and 5 illustrate a block diagrams of a method. The steps described with regard to FIGS. 4 and 5 may be performed due to the execution of software code stored in a memory (e.g., at least one memory 210, 310) associated with an apparatus (e.g., as shown in FIGS. 2B and 3A) and executed by at least one processor (e.g., at least one processor 205, 305) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 4 and 5.

FIG. 4 illustrates a block diagram of a method for conducting a portion of a web-based video call according to at least one example embodiment. As shown in FIG. 4, in step S405 a web-based video conference is established. The web-based video call can be a virtual teleportation video call implemented in a browser. For example, a first participant on a first device can open a webpage including a video call web application and invite a second participant(s) on a second device(s) using the video call web application (or other communication tool (e.g., email, messaging and/or the like)). The second participant(s) can join the video call by opening a webpage including the video call web application on the second device and requesting to join the video call. The first participant can accept the second participant(s) into the video call. For example, the first participant on the first device can open a webpage including a video call web application and call the second participant on the second device using the video call web application. The second participant can join the video call by opening a webpage including the video call web application to answer the video call.

A video call application can be web-based and/or use an application installed on a device. In either case, a server configured to control streaming communications is used. In example implementations, the video call can stream video directly from the first device to the second device. In other words, the video call can be streamed from the first device to the second device (e.g., peer-to-peer) without using a server (e.g., a third-party server) configured to control streaming communications. Therefore, example implementations enable new video call functions (e.g., a virtual teleportation video call) in a browser without use of a server configured to control streaming communications (e.g., a third-party server).

By conducting the video call in a browser, example implementations can enable (or help enable) a zero-installation (e.g., without user installed applications or plug-ins) video call. By eliminating the server, example implementations can enable (or help enable) communications with low latency, device/platform independence (e.g., work in any browser), more secure (e.g., a server can add a security risk layer and no third-party services), adaptive to network conditions, without the need for specialized tools (e.g., plug-ins) and/or the like. The webpage(s) including the video call web application can use a web-based communications standard (e.g., webRTC, VoIP, RTP, PTP Telephony, and/or the like).

In step S410 a video is captured. For example, the first participant can capture video using a computing device (e.g., desktop computer, laptop computer, mobile device, and/or the like). The video can include a plurality of frames. Each frame can be used in a real time virtual teleportation video call via a webpage executing in a browser. Each frame can represent the first participant as the image of the person to be communicated.

In step S415 the video is segmented. For example, each frame of the streaming video can be segmented. Image segmentation for body parts can be part of a ML tool or model. This ML tool can be configured to group pixels in an image into semantic areas to locate objects and boundaries. For example, the ML tool or model can be configured to classify the pixels of an image into two categories: 1) pixels that represent a person and 2) pixels that represent background. Then the pixels that represent the person can be segmented from the image. Alternatively, segmenting the frame can include identifying each object in the frame and selecting the first participant as the segment. For example, as discussed in more detail above a trained ML model can place a plurality of boxes (sometimes called bounding boxes) on the image. The object identifier can associate data (e.g., features associated with pixels of the image) with each of the boxes. The data can indicate an object in the box (the object can be no object or a portion of an object). An object can be identified by its features. The features can be classified as a person. Then the pixels that represent the person can be segmented from the image.

The webpage (e.g., the video call web application executing in the browser) can include a trained machine learned (ML) model implemented in JavaScript (e.g., TensorFlow.js). The trained machine learned (ML) model implemented in JavaScript can be configured to segment the frame (e.g., identifying objects) and select the first participant (e.g., a human) as an image segment (e.g., segment 115).

In an example implementation, there may be two or more participants (e.g., humans). The first participant may not the one standing closer to the camera of the first device and in full view wanting to be projected. Therefore, select one to n participants may be selected from a scene to project one to n humans simultaneously as desired.

In step S420 the at least one segment is processed. In an example implementation processing the at least one segment can be optional. In other words, processing can continue to step S425 without performing step S420. Processing the at least one segment can include image modification of the at least one segment (e.g., segment 115). For example, image modification can include image enhancement (e.g., quality improvement), image conversion (e.g., 2D to 3D), image warping (cause the 2D image to appear 3D without 3D conversion), and/or the like.

In step S425 the at least one segment is encoded. For example, the at least one segment can be encoded using the standard used to conduct the video call. The standard used to conduct the video call can include loading an encoder when the web-based video conference is established. For example, WebRTC can be used to conduct the video call. WebRTC-compatible browsers may or may not use or support, at least, the VP8 and/or AVC encoder/decoder standards. In step S430 the encoded at least one segment is streamed. For example, the encoded at least one segment can be communicated from a first device to a second device via, for example, the internet using the WebRTC standard. In another implementation, data (e.g., raw binary data) can be communicated without use of a standard.

FIG. 5 illustrates a block diagram of a method for conducting another portion of a web-based video call according to at least one example embodiment. As shown in FIG. 5, in step S505 a web-based video conference is established. For example, a first participant on a first device can open a webpage including a video call web application and invite a second participant(s) on a second device(s) using the video call web application (or other communication tool (e.g., email, messaging and/or the like)). The second participant(s) can join the video call by opening a webpage including the video call web application on the second device and requesting to join the video call. The first participant can accept the second participant(s) into the video call. For example, the first participant on the first device can open a webpage including a video call web application and call the second participant on the second device using the video call web application. The second participant can join the video call by opening a webpage including the video call web application to answer the video call. The video call can stream video directly from the first device to the second device. In other words, the video call can be streamed from the first device to the second device without using a server configured to control streaming communications.

A video call application can be web-based and/or use an application installed on a device. In either case, a server configured to control streaming communications is used. In example implementations, the video call can stream video directly from the first device to the second device. In other words, the video call can be streamed from the first device to the second device (e.g., peer-to-peer) without using a server (e.g., a third-party server) configured to control streaming communications. Therefore, example implementations enable new video call functions (e.g., a virtual teleportation video call) in a browser without use of a server configured to control streaming communications (e.g., a third-party server).

By conducting the video call in a browser, example implementations can enable (or help enable) a zero-installation (e.g., without user installed applications or plug-ins) video call. By eliminating the server, example implementations can enable (or help enable) communications with low latency, device/platform independence (e.g., work in any browser), more secure (e.g., a server can add a security risk layer and no third-party services), adaptive to network conditions, without the need for specialized tools (e.g., plug-ins) and/or the like. The webpage(s) including the video call web application can use a web-based communications standard (e.g., webRTC, VoIP, RTP, PTP Telephony, and/or the like).

In step S510 a video stream is received. For example, encoded frames of video corresponding to the video call can be communicated from a first device to a second device via, for example, the internet using the WebRTC standard. The second device can receive the video stream frame-by-frame and/or in groups of frames. In step S515 the video stream is decoded as a first video. For example, each frame of the streaming video can be decoded. The standard used to conduct the video call can include loading a decoder when the web-based video conference is established. For example, WebRTC can be used to conduct the video call. WebRTC-compatible browsers can use or support, at least, the VP8 and/or AVC encoder/decoder standards. In another implementation, data (e.g., raw binary data) can be communicated without use of a standard.

In step S520 video is captured as a second video. For example, the second participant can capture video using a computing device (e.g., desktop computer, laptop computer, mobile device, and/or the like). The video can include a plurality of frames. Each frame can be used in a real time virtual teleportation video call via a webpage executing in a browser. Each frame can represent the real-world into which the image of the first participant can be projected into.

In step S525 a normal vector associated with the second video is determined. For example, a normal vector associated with the real-world (e.g., as an image captured using the camera of the device and being displayed via a web browser) and the plane position can be determined. In an example implementation, the normal vector associated with each pixel in the real-world can be determined (e.g., estimated). Once there is a normal vector associated with each pixel, a normal vector can be associated with pixels in world coordinates. The normal vectors and the pixels can be generated using a web-based augmented reality tools, and/or JavaScript tools (e.g., WebXR)). For example, the normal vectors can be projected from the plane into pixels in the real-world.

In step S530 generate a plane. For example, the plane can be generated by generating a 2D virtual structure (e.g., a rectangle). The 2D structure can have a size based on the display of the second device. For example, the 2D structure can have a size that is proportional to the display and smaller than the display. The 2D structure can be transparent (e.g., to allow a background to be visible). The 2D structure can be implemented via a function call (e.g., via a web-based display tool and/or a web browser).

In step S535 the plane is oriented based on the normal vector. For example, the plane can be oriented (e.g., translated, rotated, and/or the like) relative to the real-world such that the plane approximates a perpendicular orientation with the normal vector. Orientation can be implemented and/or confirmed by projecting a normal vector from the plane into the real-world. The normal vector associated with the real-world and the normal vector associated with the plane should be approximately equivalent and in opposite directions.

In step S540 the first video is projected into the plane of the second video. For example, pixels representing an image of the first participant (e.g., decompressed segment 115) can be added to the plane. In step S545 the first video and the second video are rendered. The projection can be implemented as a function of rendering the modified (e.g., with the first video (or communicated image of the first participant)) second (or real-world) video on the display of the second device. Rendering can be a function of the displaying of the web-page in a browser implementing the video call and/or the web-based communications standard (e.g., webRTC, VoIP, RTP, PTP Telephony, and/or the like).

Figure 6:
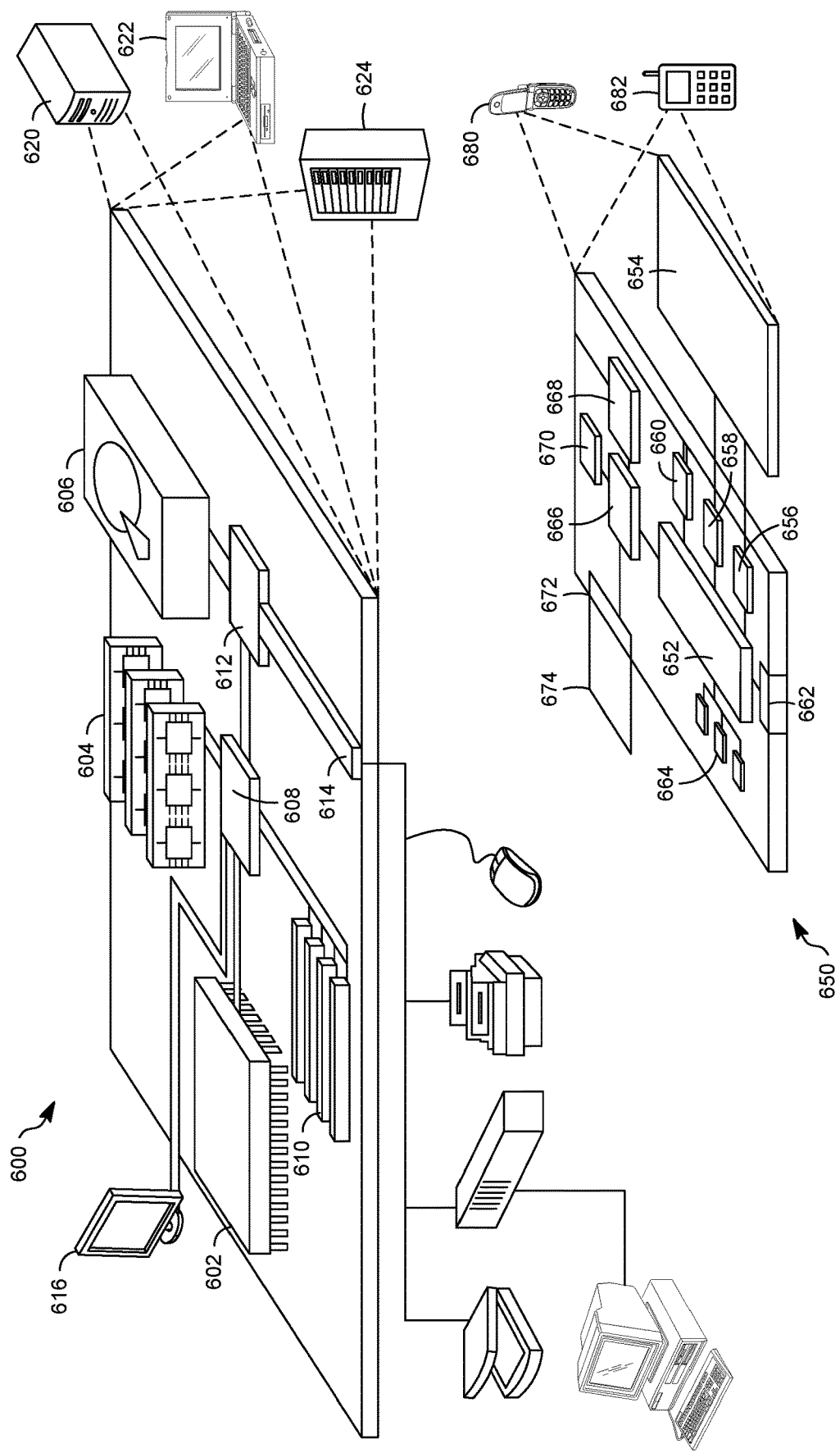
FIG. 6 shows an example of a computer device and a mobile computer device according to at least one example embodiment.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

In a general aspect, a device, a system, a non-transitory computer-readable medium (having stored thereon computer executable program code which can be executed on a computer system), and/or a method can perform a process with a method including opening a web-based video call in a browser on a first device, receiving a request to join the web-based video call from a second device, capturing, by the first device, a video including a frame, segmenting, by the first device, the frame, selecting, by the first device, at least one segment of the segmented frame, and streaming, directly from the first device to the second device, the video including the at least one segment as a real-time virtual teleportation.

Implementations can include one or more of the following features. For example, the opening of the web-based video call includes loading a webpage, the webpage including code configured to implement a trained machine learned model, the trained machine learned model can be configured to segment the frame and select the at least one segment. The at least one segment can be an image of a participant in the web-based video call. The web-based video call can be implemented using a web-based communications standard. The segmenting of the frame can include grouping pixels in the frame into semantic areas to locate objects and boundaries, classifying pixels of the frame into two categories: 1) pixels that represent a person and 2) pixels that represent background, and segmenting the pixels that represent the person from the frame. The segmenting of the frame can include identifying each object in the frame, the selecting of at least one segment includes selecting an object as the at least one segment, and the object can be a participant in the web-based video call. The at least one segment can be an image of a participant in the web-based video call, and the method can further include converting the image from a two-dimensional image to a three-dimensional image. The at least one segment can be an image of a participant in the web-based video call, and the method can further include applying a filter to the image. The web-based video call can be implemented as a zero-installation web application.

In another general aspect, a device, a system, a non-transitory computer-readable medium (having stored thereon computer executable program code which can be executed on a computer system), and/or a method can perform a process with a method including opening a web-based video call webpage in a browser on a first device, communicating, by the first device, a request to join a web-based video call from a second device receiving, at the first device directly from the second device, a streamed video as a first video, capturing, by the first device, a second video, orienting, by the first device, the first video based on the second video, projecting, by the first device, the first video into the second video to generate a third video, and rendering, by the first device, a webpage including the third video.

Implementations can include one or more of the following features. For example, the method can further include generating a plane, and the orienting of the first video can include determining a normal vector associated with the second video, and at least one of rotating and translating the first video based on the normal vector. The method can further include generating a plane and positioning the plane in the second video, wherein the projecting of the first video into the second video includes adding the first video to the plane. The method can further include generating a plane and positioning the plane in the second video, and the orienting of the first video can include determining a normal vector associated with the second video, and at least one of rotating and translating the first video based on the normal vector, and the projecting of the first video into the second video can include adding the first video to the plane. The first video can be of a first participant in the web-based video call, and the second video can be a real-world video. The plane can be a transparent two-dimensional virtual structure positioned in the second video. The plane can have a size that is proportional to a display of a device rendering the web-based video call webpage. The web-based video call webpage can include code configured to implement a trained machine learned model, and the web-based video call webpage can include code configured to implement a web-based augmented reality tool. The web-based video call webpage and the web-based video call can be implemented as a zero-installation web application.

In yet another general aspect, a device, a system, a non-transitory computer-readable medium (having stored thereon computer executable program code which can be executed on a computer system), and/or a method can perform a process with a method including opening a web-based video call in a browser on a first device, receiving a request to join the web-based video call from a second device, capturing, by a first device, a first video including a frame, segmenting, by the first device, the frame, selecting, by the first device, at least one segment of the segmented frame, streaming, directly from the first device to the second device, the first video including the at least one segment as a first real-time virtual teleportation image, receiving, by the first device directly from the second device, a streamed video as a second video, the second video including a second real-time virtual teleportation image, capturing, by the first device, a third video, orienting, by the first device, the second video based on the third video, projecting, by the first device, the second video into the third video to generate a fourth video including the second real-time virtual teleportation image, and rendering, by the first device, a webpage including the fourth video.

Implementations can include one or more of the following features. For example, the opening web-based video call can include loading a webpage, the webpage can include code configured to implement a trained machine learned model, the trained machine learned model can be configured to segment the frame and select the at least one segment, and the webpage including code can be configured to implement a web-based augmented reality tool. The web-based video call can be implemented as a zero-installation web application. The segmenting of the frame can include identifying each object in the frame, the selecting of at least one segment can include selecting an object as the at least one segment, and the object can be a participant in the web-based video call. The method can further include generating a plane and positioning the plane in the second video, and the orienting of the first video can includes determining a normal vector associated with the second video, and at least one of rotating and translating the first video based on the normal vector, and the projecting of the first video into the second video can include adding the first video to the plane.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   opening a web-based video call in a browser on a first device;
   receiving, by the first device, a request to join the web-based video call from a second device;
   capturing, by the first device, a first video including a frame;
   segmenting, by the first device, the frame;
   selecting, by the first device, at least one segment of the segmented frame;
   streaming, directly from the first device to the second device, the first video including the at least one segment as a real-time virtual teleportation;
   receiving, by the first device from the second device, a second video;
   using the browser, selecting an orientation and a location in an environment of the first device; and
   projecting the second video onto a background representing the environment based on the orientation and location.

2. The method of claim 1, wherein establishing the web-based video call includes loading a webpage,
   the webpage including code configured to implement a trained machine learned model, and
   the trained machine learned model is configured to segment the frame and select the at least one segment.

3. The method of claim 1, wherein the at least one segment is an image of a participant in the web-based video call.

4. The method of claim 1, wherein the web-based video call is implemented using a web-based communications standard.

5. The method of claim 1, wherein the segmenting of the frame includes:
grouping pixels in the frame into semantic areas to locate objects and boundaries,
classifying pixels of the frame into two categories: 1) pixels that represent a person and 2) pixels that represent background, and
segmenting the pixels that represent the person from the frame.

6. The method of claim 1, wherein
the segmenting of the frame includes identifying each object in the frame,
the selecting of at least one segment includes selecting an object as the at least one segment, and
the object is a participant in the web-based video call.

7. The method of claim 1, wherein the at least one segment is an image of a participant in the web-based video call, the method further comprising:
converting the image from a two-dimensional image to a three-dimensional image.

8. The method of claim 1, wherein the at least one segment is an image of a participant in the web-based video call, the method further comprising:
applying a filter to the image.

9. The method of claim 1, wherein the web-based video call is implemented as a zero-installation web application.

10. The method of claim 9, wherein
a web-based video call webpage includes code configured to implement a trained machine learned model, and
the web-based video call webpage includes code configured to implement a web-based augmented reality tool.

11. The method of claim 9, wherein a web-based video call webpage and the web-based video call are implemented as a zero-installation web application.

12. A method comprising:
opening a web-based video call in a browser on a first device;
receiving a request to join the web-based video call from a second device;
capturing, by a first device, a first video including a frame;
segmenting, by the first device, the frame;
selecting, by the first device, at least one segment of the segmented frame;
streaming, directly from the first device to the second device, the first video including the at least one segment as a first real-time virtual teleportation image;
receiving, by the first device directly from the second device, a streamed video as a second video, the second video including a second real-time virtual teleportation image;
capturing, by the first device, a third video;
orienting, by the first device, the second video based on the third video;
projecting, by the first device, the second video into the third video to generate a fourth video including the second real-time virtual teleportation image; and
rendering, by the first device, a webpage including the fourth video.

13. The method of claim 12, wherein establishing the web-based video call includes loading a webpage,
the webpage including code configured to implement a trained machine learned model,
the trained machine learned model is configured to segment the frame and select the at least one segment, and
the webpage including code configured to implement a web-based augmented reality tool.

14. The method of claim 12, wherein the web-based video call is implemented as a zero-installation web application.

15. The method of claim 12, wherein the segmenting of the frame includes:
grouping pixels in the frame into semantic areas to locate objects and boundaries,
classifying pixels of the frame into two categories: 1) pixels that represent a person and 2) Pixels that represent background, and
segmenting the pixels that represent the person from the frame.

16. The method of claim 12, wherein
the segmenting of the frame includes identifying each object in the frame,
the selecting of at least one segment includes selecting an object as the at least one segment, and
the object is a participant in the web-based video call.

17. The method of claim 12, further comprising generating a plane and positioning the plane in the second video, wherein
the orienting of the second video includes:
determining a normal vector associated with the second video, and
at least one of rotating and translating the first video based on the normal vector, and
the projecting of the second video into the second video includes adding the first video to the plane.

18. A method comprising:
receiving, by a first device, a request to join a web-based video call from a second device;
capturing a first video by the first device;
segmenting a frame of the first video;
selecting a segment of the segmented frame; and
streaming the first video including the segment directly from the first device to the second device;
receiving a second video;
using a user interface of the first device, selecting an orientation and a location in an environment of the first device; and
projecting the second video onto a background representing the environment based on the orientation and location.

19. The method of claim 18, wherein
the request to join the web-based video call is receive in a webpage,
the webpage includes code configured to implement a trained machine learned model, and
the trained machine learned model is configured to segment the frame and select the segment.

20. The method of claim 18, wherein the segment is an image of a participant in the web-based video call.

21. The method of claim 18, wherein the web-based video call is implemented using a web-based communications standard.

22. The method of claim 18, wherein the segmenting of the frame includes:
grouping pixels in the frame into semantic areas to locate objects and boundaries,
classifying pixels of the frame into two categories: 1) pixels that represent a person and 2) pixels that represent background, and segmenting the pixels that represent the person from the frame.

23. The method of claim 18, wherein the segmenting of the frame includes identifying an object in the frame, the selecting of the segment includes selecting the object as the segment, and the object is a participant in the web-based video call.

\* \* \* \* \*